(12) United States Patent
Seeley et al.

(10) Patent No.: US 10,099,169 B2
(45) Date of Patent: Oct. 16, 2018

(54) ABATEMENT SYSTEM

(71) Applicant: Edwards Limited, Burgess Hill, West Sussex (GB)

(72) Inventors: Andrew James Seeley, Clevedon (GB); Duncan Michael Price, Clevedon (GB); Gary Peter Knight, Clevedon (GB)

(73) Assignee: Edwards Limited, Burgess Hill, West Sussex (GB)

(*) Notice: Subject to any disclaimer, the term of this patent is extended or adjusted under 35 U.S.C. 154(b) by 0 days.

(21) Appl. No.: 15/746,261

(22) PCT Filed: Jun. 15, 2016

(86) PCT No.: PCT/GB2016/051763
§ 371 (c)(1),
(2) Date: Jan. 19, 2018

(87) PCT Pub. No.: WO2017/013382
PCT Pub. Date: Jan. 26, 2017

(65) Prior Publication Data
US 2018/0207576 A1   Jul. 26, 2018

(30) Foreign Application Priority Data

Jul. 22, 2015  (GB) .................................. 1512901.8

(51) Int. Cl.
*F04C 19/00*  (2006.01)
*B01D 53/14*  (2006.01)
(Continued)

(52) U.S. Cl.
CPC ....... *B01D 53/1406* (2013.01); *B01D 53/323* (2013.01); *F04C 19/00* (2013.01);
(Continued)

(58) Field of Classification Search
None
See application file for complete search history.

(56) References Cited

U.S. PATENT DOCUMENTS 3,068,801 A   12/1962  Murray
5,672,322 A   9/1997  Visser
(Continued)

FOREIGN PATENT DOCUMENTS

EP   0856664 A1   8/1998
EP   2587065 A1   5/2013
WO   2010019079 A1   2/2010

OTHER PUBLICATIONS

British Search Report dated Jan. 22, 2016 and Examination Report dated Jan. 25, 2016 for corresponding British Application No. GB1512901.8.
(Continued)

*Primary Examiner* — Walter D. Griffin
*Assistant Examiner* — Jelitza M Perez
(74) *Attorney, Agent, or Firm* — Theodore M. Magee; Westman, Champlin & Koehler, P.A.

(57) ABSTRACT

Liquid ring pumps are used to pump a variety of fluid types. The present invention provides a two stage liquid ring pump through which an exhaust gas comprising compounds to be destroyed is passed. The exhaust gas passes through the first stage to a gas abatement device, following which it is passed back to the second stage of the liquid ring pump for removal of the compounds formed in said abatement device. The stages of the liquid ring pump may be adjustable.

16 Claims, 5 Drawing Sheets

(51) Int. Cl.
*B01D 53/32* (2006.01)
*F04C 29/00* (2006.01)

(52) U.S. Cl.
CPC ...... *F04C 19/001* (2013.01); *B01D 2252/103* (2013.01); *B01D 2259/818* (2013.01); *F04C 29/0042* (2013.01); *F04C 2240/10* (2013.01); *F04C 2240/20* (2013.01); *F04C 2250/30* (2013.01)

(56) References Cited

U.S. PATENT DOCUMENTS

| | | | |
|---|---|---|---|
| 5,803,713 A | | 9/1998 | Huse |
| 5,899,668 A | * | 5/1999 | Shenoi .................... F04C 23/00 417/68 |
| 2005/0142000 A1 | | 6/2005 | Maquin et al. |
| 2011/0142740 A1 | * | 6/2011 | Lundahl ................. B01D 53/14 423/238 |

OTHER PUBLICATIONS

PCT Search Report and Written Opinion dated Aug. 30, 2016 for corresponding PCT Application No. PCT/GB2016/051763.

* cited by examiner

ABATEMENT SYSTEM

CROSS-REFERENCE OF RELATED APPLICATION

This application is a Section 371 National Stage Application of International Application No. PCT/GB2016/051763, filed Jun. 15, 2016, which is incorporated by reference in its entirety and published as WO 2017/013382 A1 on Jan. 26, 2017 and which claims priority of British Application No. 1512901.8, filed Jul. 22, 2015.

FIELD

Embodiments relate to a liquid ring pump for treating an effluent gas stream from a processing chamber. In particular an effluent gas stream which is reactive with or soluble in a service liquid of the pump.

BACKGROUND

Liquid ring pumps are used to pump a variety of gases, however their typical materials of construction (e.g. stainless steel, cast iron, brass, etc.) precludes their use with strongly corrosive or reactive gases (i.e. acidic, basic, oxidising or reducing gases). Known liquid ring pumps have been made from exotic materials such titanium, ceramics and polymers, however, not only can these materials be costly but it is difficult to manufacture pumps with these materials with the required close dimensional tolerances between certain components, for example the rotor and the stator.

In some pumping applications an effluent gas stream is chemically reactive with, or soluble in, the service liquid in the liquid ring pump, which is typically water, generating corrosion products. Such corrosion products can cause additional corrosion and wear issues.

The discussion above is merely provided for general background information and is not intended to be used as an aid in determining the scope of the claimed subject matter. The claimed subject matter is not limited to implementations that solve any or all disadvantages noted in the background.

SUMMARY

Embodiments seek at least to mitigate one or more of the problems associated with the prior art.

An abatement system for treating an effluent gas stream, the system comprising: a two-stage liquid ring pump, the stages comprising respective gas inlets and gas outlets; and at least one abatement apparatus, wherein the gas inlet of the first stage of the liquid ring pump is arranged to receive said effluent gas stream for treatment in the first stage and the gas outlet of the first stage is arranged to exhaust gas to the abatement apparatus, and the gas inlet of the second stage of the liquid ring pump is arranged to receive gas treated by the abatement apparatus for treatment by the second stage and the gas outlet of the second stage is arranged to exhaust gas so that the effluent gas stream can be treated in series by the first stage of the liquid ring pump, the abatement apparatus and the second stage of the liquid ring pump.

Other preferred and/or optional aspects of the invention are defined in the accompanying claims.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In order that the embodiments may be well understood, several embodiments thereof, which is given by way of example only, will now be described with reference to the accompanying drawings, in which.

DETAILED DESCRIPTION

Figure 1:
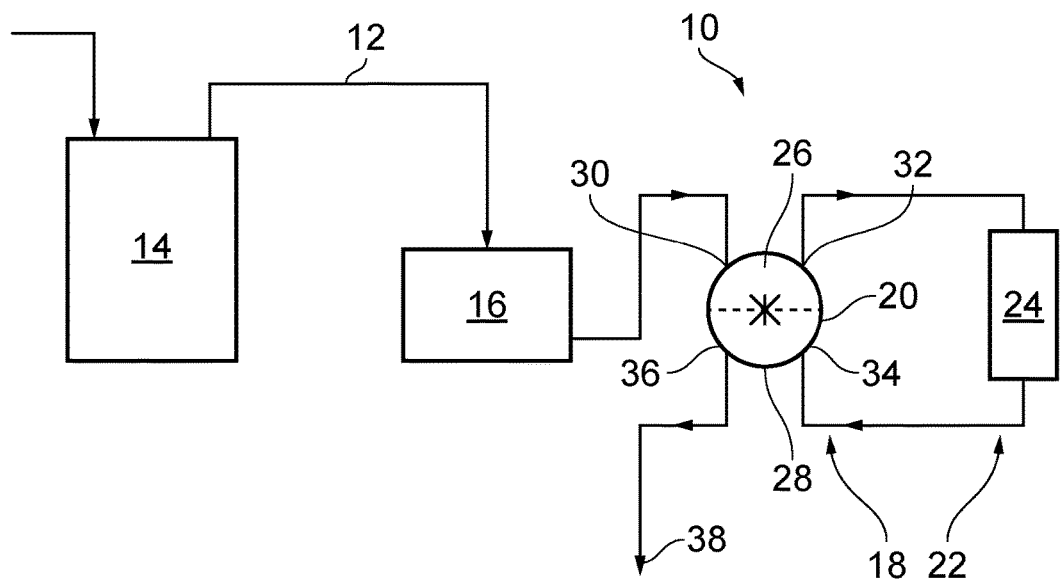
FIG. 1 illustrates schematically an abatement system including a two stage liquid ring pump.

With reference first to FIG. 1, an abatement system 10 is shown for treating an effluent gas stream for example an effluent gas stream 12 exhausted from a processing tool or chamber 14 for processing semiconductors, flat panel displays, and solar panels. A dry pumping arrangement 16 evacuates gas from the chamber which may be at vacuum in the region of 1 mbar to $1 \times 10^{-6}$ mbar for example. The dry pumping arrangement may comprise a high vacuum pump such as a turbo molecular pump and a lower vacuum pump such as a blower.

The abatement system 10 comprises a two-stage liquid ring pump 20, comprising two pumping stages 26, 28, and an abatement apparatus 22. The first stage 26 of the liquid ring pump 20 serves as a pre-scrubber and the second stage 28 as a post scrubber for the effluent gas flow which flows to and from the abatement device. The abatement apparatus 22 may be, for example, a reaction chamber, catalytic, plasma or combustor 24 for abating a component of the effluent gas flow.

The first pumping stage 26 comprises a gas inlet 30 and a gas outlet 32. The second pumping stage 28 comprises a gas inlet 34 and a gas outlet 36. The gas inlet 30 of the first stage 26 is arranged with suitable pipework to receive the effluent gas stream 12 from the dry pumping arrangement 16 for pre scrubbing treatment in the first stage 26. The gas outlet 32 of the first stage is arranged with suitable pipework to exhaust gas to the abatement apparatus 22. A liquid gas separator may be provided between the first stage 26 of the liquid ring pump 20 and the abatement apparatus 22 to separate gas from water exhausted from the first stage 26. However, as indicated in more detail below, a separator may not be preferred in certain abatement applications.

The abatement apparatus 22 treats gas exhausted from the first stage 26 of the liquid ring pump 20 for example by plasma reaction or combustion.

The gas inlet 34 of the second stage 28 of the liquid ring pump 20 is arranged with suitable pipework to receive gas treated by the abatement apparatus 22 for treatment by the second stage 28. The gas outlet 36 of the second stage is arranged with suitable pipework to exhaust gas to a facility 38 after the effluent gas stream has been treated by the second stage of the liquid ring pump.

In this way, the effluent gas stream can be treated in series by the first stage 26 of the liquid ring pump 20, the abatement apparatus 22 and the second stage 28 of the liquid ring pump.

Figure 2:
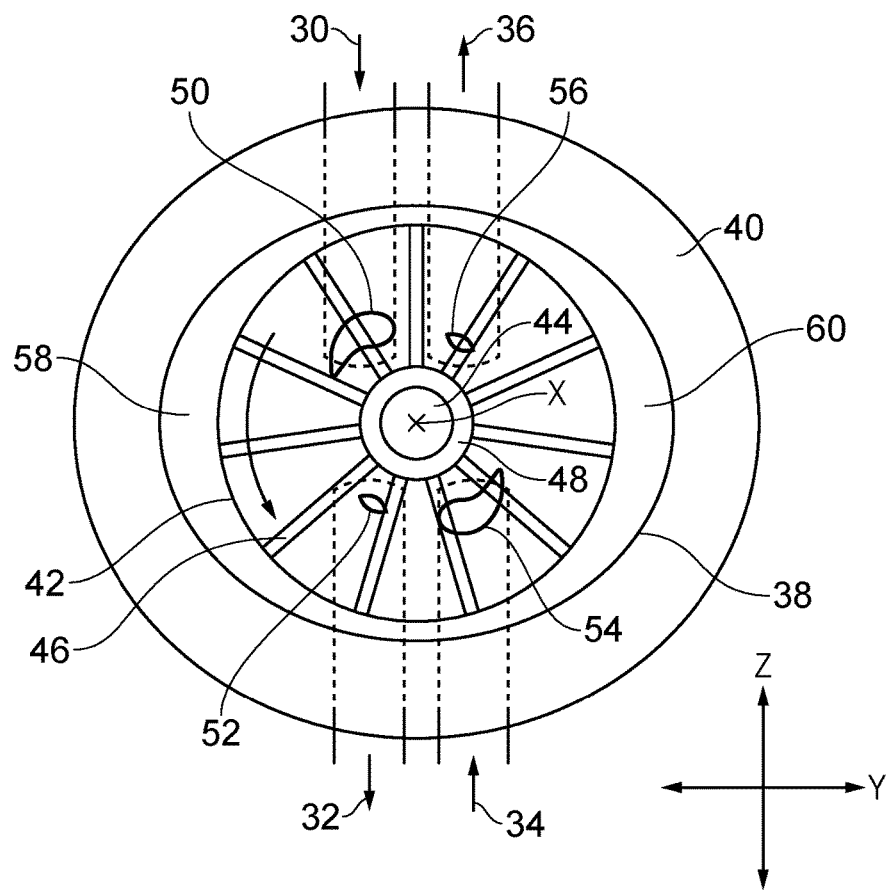
FIG. 2 illustrates a radial cross-section through a first pump.

The two-stage pumping arrangement of the liquid ring pump 20 may take a number of suitable forms. FIG. 2 shows a radial cross-section taken through a pumping chamber and rotor of one suitable arrangement of the liquid ring pump 20. The section is taken generally perpendicularly to the axis X of the pump.

Figure 6:
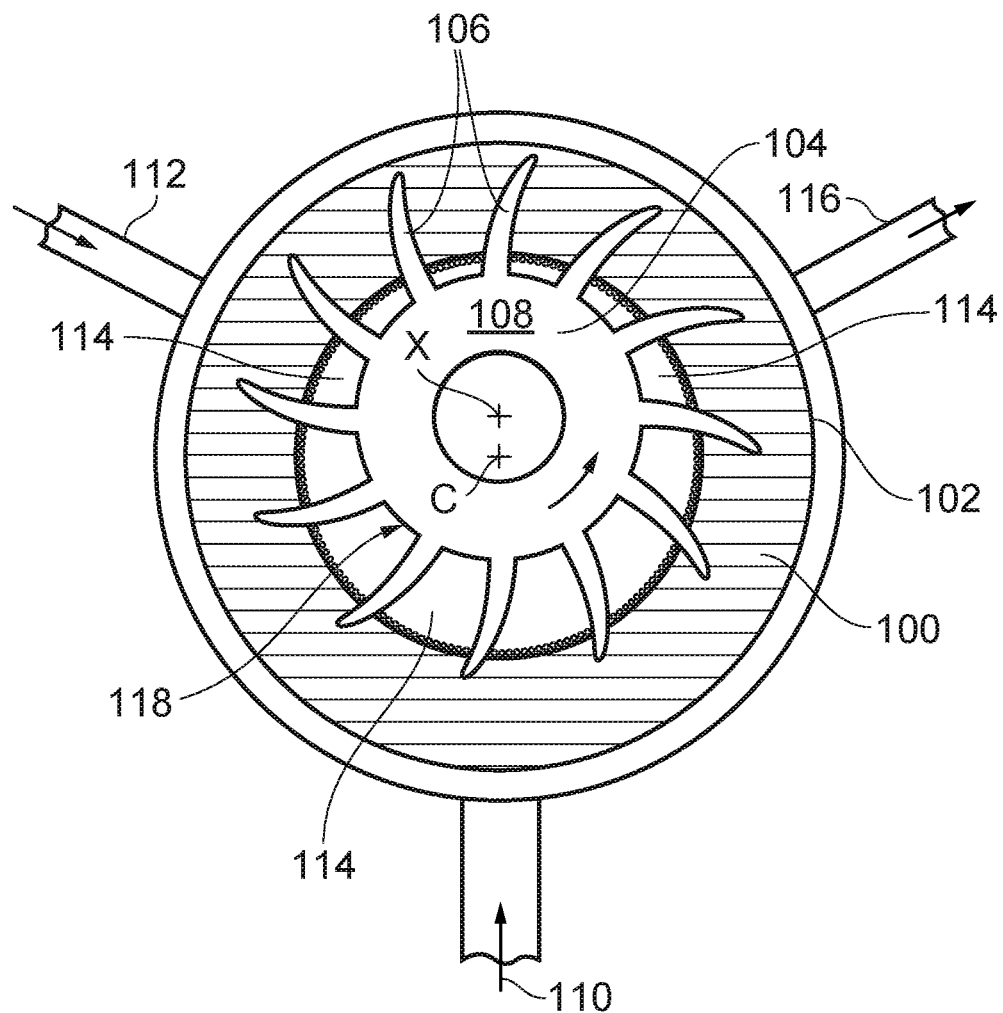
FIG. 6 shows a radial cross-section through a prior art pump.

Liquid ring pumps are well known in the art and the pumping mechanism of a typical pump is shown in FIG. 6. A liquid ring 100 is formed around an outer periphery of a generally cylindrical pumping chamber 102 on rotation of a rotor 104 mounted for rotation about an axis X which is eccentric to the central axis C of the pumping chamber. The rotor has blades 106 that extend radially outwardly from a hub 108 and are equally spaced around the rotor. With rotation of the rotor, the blades engage the liquid conveyed to the chamber from a source of liquid 110 forming an annular ring inside the pumping chamber.

This means that gas entering through an inlet 112 that enters compression regions 114 located between adjacent rotor blades 106 is moving radially outward, away from the rotor hub, while on the outlet side of the pump the gas is moving radially inward toward the rotor hub prior to exhaust through outlet 116. This results in a piston-type pumping action on the gas passing through the pump. That is, the compression regions increase and decrease in volume through rotation of the rotor. The compression regions are defined by adjacent rotor blades, the liquid ring and an outer surface 118 of the hub. Accordingly, gas is pumped through a single stage for each rotation of the rotor.

The FIG. 2 arrangement provides a pumping chamber which is non-circular in cross-section such that gas can be pumped from the gas inlets to the gas outlets of the first and second stages for each half rotation of the rotor. That is, the pump is configured so that a rotor is received for forming a liquid ring in the pumping chamber and pumping gas from the gas inlet to the gas outlet of the first stage and from the gas inlet to the gas outlet of the second stage of the pump. As described in more detail below, the liquid ring is not cylindrical in FIG. 2 as would be the case in a typical liquid ring pump, and instead may be elliptical or generally elliptical.

Referring to FIG. 2, a pumping chamber 38 is formed by a stator 40. The pumping chamber has a generally elliptical cross-section having a major axis in the Y direction and a minor axis in the Z direction. The elliptical shape is one way in which two-stage pumping can be provided in a single pumping chamber. A rotor 42 is mounted to a drive shaft 44 for rotation in the chamber as indicated by the arrow showing in FIG. 2 counter-clockwise movement. The rotor rotates about a rotor axis X which is generally coincident with the central axis of the pumping chamber, at the intersection of the Y and Z axes. The rotor comprises a plurality of rotor blades 46 extending radially outwardly from a central hub 48.

In the first stage of pumping, gas is pumped in a first direction relative to the major axis Y of the ellipse from inlet 30 to outlet 32 and in the second stage, gas is pumped in a second, generally opposing direction relative to the major axis Y from an inlet 34 to an outlet 36. The pumping chamber comprises for the first stage inlet port 50 and outlet port 52 in a first pumping chamber portion 58 and for the second stage inlet port 54 and outlet port 56 in a second pumping chamber portion 60. The inlet port 50 and outlet port 52 are in gas communication with respective inlet 30 and outlet 32 of the first stage. The inlet port 54 and outlet port 56 are in gas communication with respective inlet 34 and outlet 36 of the second stage.

In the first stage of pumping, the pumping chamber portion 58 is shaped so that gas conveyed into the inlet port 50 enters a compression region between rotor blades 46 and undergoes piston-like pumping action over rotation of the rotor through approximately 180° prior to exhaust through outlet port 52. In the second stage of pumping, the pumping chamber portion 60 is shaped so that gas conveyed into the inlet port 54 enters a compression region between rotor blades 46 and undergoes piston-like pumping action over rotation of the rotor through approximately 180° pumping chamber portions prior to exhaust through outlet port 56.

As shown, the pumping chamber 38 is generally elliptical and therefore the shape of each pumping chamber portion 58, 60 causes the compression region to increase and decrease in volume over rotation of the rotor through approximately 180°. It will be appreciated that an elliptical shape is not the only possible shape in which the compression regions can be caused to increase and decrease in volume a plurality of times over one full rotation of the rotor. In this regard, the profile of the first stage pumping chamber sections may be such that its radius increases from a gas inlet at between 0° and 30° to its maximum between 0° and 180° and preferably at about 90°. Subsequently, the radius decreases from the maximum to its minimum radius at the pump outlet at between about 150° and 180°. Similarly, the profile of the second stage pumping chamber section may be such that its radius increases from a gas inlet at between 180° and 210° to its maximum between 180° and 360° and preferably at about 270°. Subsequently, the radius decreases from a maximum to a minimum radius at the pump outlet at between about 330° and 360°. Preferably, the profile of both pumping chamber portions are curved.

In FIG. 2, the first pumping chamber portion 58 is symmetrical with the second pumping chamber portion 60, such that similar pumping characteristics are achieved in the first and the second stage. Alternatively, the pumping chamber portions may be asymmetric such that the first stage and the second stage have dissimilar pumping characteristics. A volume of a pumping chamber portion 58 of the first stage 26 is greater than a volume of a pumping chamber portion 60 of a second stage 28 such that greater compression can be provided when pumping gas through the first stage compared to the second stage. For example, the pumping chamber has a semi-major axis defining the first stage which is longer than the semi-major axis defining the second stage so that compression ratio is higher in the first stage. Such dissimilar characteristics may be desirable in the present arrangement as the first stage of the liquid ring pump 20 prior to treatment by the abatement apparatus 24, may be required to provide a relatively high compression, for example for reducing a power requirement of the upstream dry pump 16. The second stage of the liquid ring pump, downstream of the abatement apparatus, may be required to provide relatively low compression, for example to pump gas to provide scrubbing but not to compress gas to any significant degree.

Figure 3:
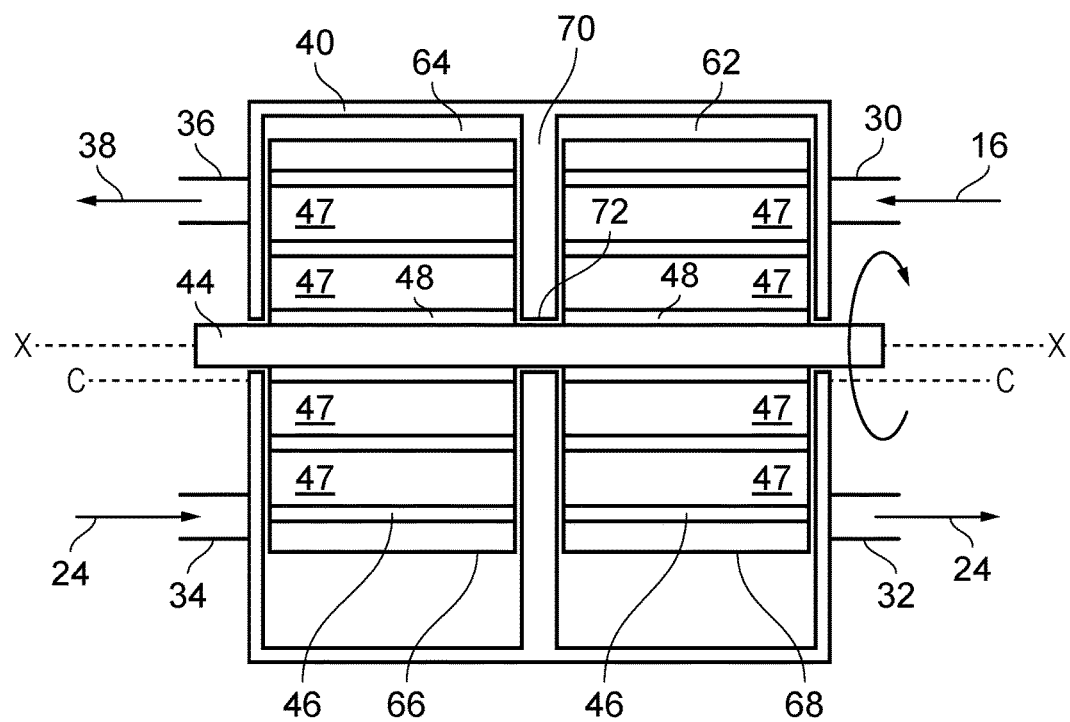
FIG. 3 shows an axial cross-section through a second pump.

In a second arrangement shown in FIG. 3, the liquid ring pump 20 comprises first and second pumping chambers 62, 64 in which respective rotors 66, 68 are received for forming liquid rings in the pumping chambers and pumping gas in the first stage from the gas inlet 30 to the gas outlet 32 of the first pumping chamber 62 and in the second stage from the gas inlet 34 to the gas outlet 36 of the second pumping chamber 64. This arrangement is similar to a typical liquid ring pump except that two pumping stages are provided and the rotors are rotated by a common drive shaft 44 for pumping gas trapped in compression regions 47 between rotor blades and the liquid ring. In this regard, rotors 66, 68 are mounted eccentrically for rotation about axis X relative to a central axis C of the generally cylindrical pumping chambers 62, 64. The stator 40 comprises a partition wall 70 between the pumping chambers having an opening 72 through which the drive shaft 44 extends.

Figure 4:
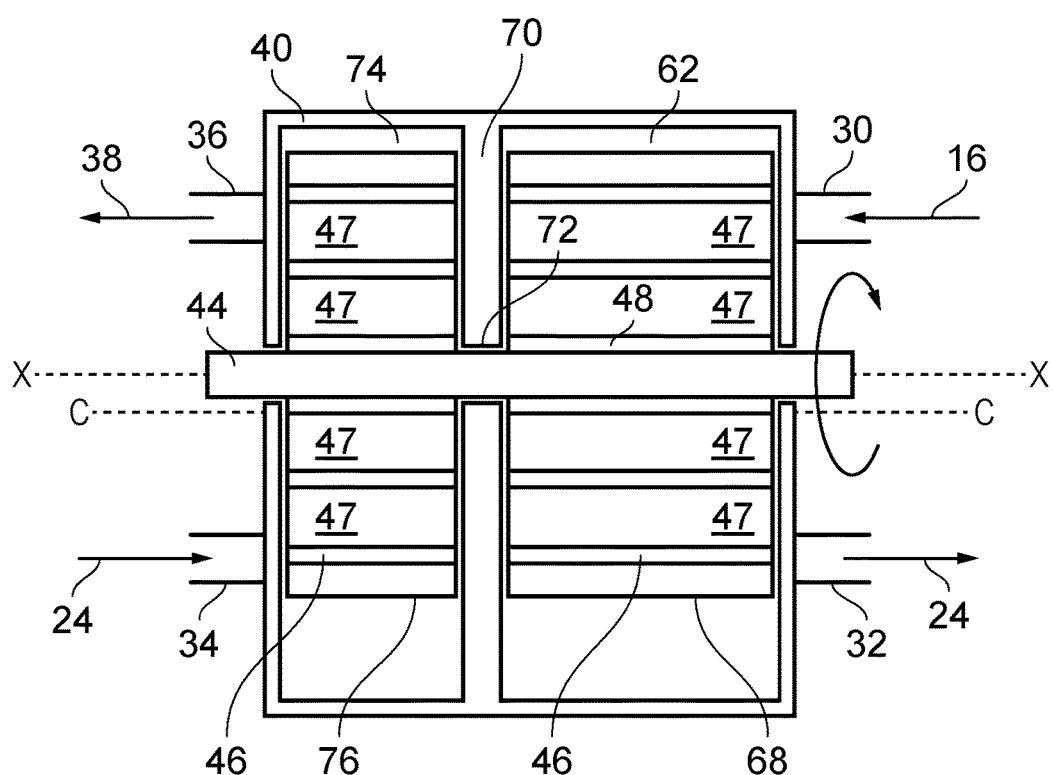
FIG. 4 shows an axial cross-section through a third pump.

As shown in FIG. 3, the first and second pumping stage having pumping chambers 62, 64 and rotors 66, 68 are generally the same and therefore have similar pumping characteristics. In one alternative shown in FIG. 4, the pumping characteristics of the first and second stages are designed to be dissimilar. FIG. 4 will be described herein only in the aspects which differ from FIG. 3.

In FIG. 4, the pumping chamber 62 and rotor 68 of the first stage has a greater axial extent, or depth, than the pumping chamber 74 and rotor 76 of the second stage. Therefore, the volume trapped in the compression regions 47 of the first stage is greater than the volume trapped in the compression regions 47 of the second stage. Accordingly, the first stage is configured for a different (larger) volumetric pumping capacity than the second stage and is therefore suitable for the arrangement shown in FIG. 1. In a further alternative, the radius of the rotor hub 48 may be different in the first and second stages of the pump to achieve dissimilar pumping characteristics. Other aspects of the rotor could be different from one stage to the next stage to achieve such dissimilar pumping characteristics, such as the circumferential spacing between rotor blades.

Figure 5:
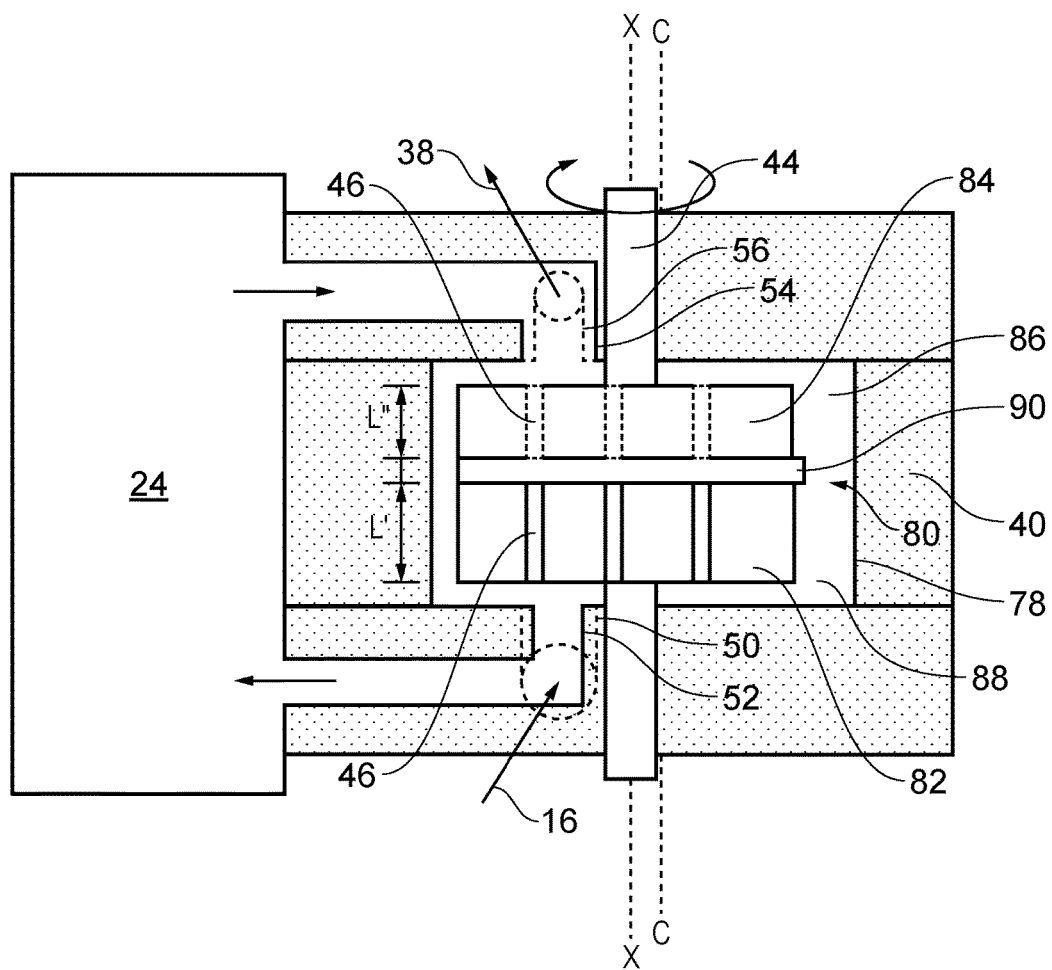
FIG. 5 shows an axial cross-section through a fourth pump.

A further arrangement of a liquid ring pump is shown in FIG. 5. In this arrangement, the liquid ring pump comprises a pumping chamber 78 in which a rotor 80 is received having two arrays 82, 84 of impeller blades 46 on axial sides thereof projecting into respective chamber portions 86, 88 of the pumping chamber for forming respective liquid ring portions in the chamber portions and pumping gas in the first stage from the gas inlet port 50 to the gas outlet port 52 of the first chamber portion 86 and in the second stage from the gas inlet port 54 to the gas outlet 56 of the second chamber portion 88.

The rotor 80 has a central generally circular disc, or back plate, 90 from which the blades of arrays 82, 84 extend. The rotor may be formed as a single piece or more than one piece and then joined together. When driven by drive shaft 44, the rotor portions 82, 84 engage with liquid in the pumping chamber 78 to form a liquid ring comprising two liquid ring portions. One portion of the ring is formed by the blades of the array 82 and the other portion of the ring is formed by the blades of the array 84. The first stage is formed by the rotor portion 82 in pumping chamber portion 88 and the second stage is formed by the rotor portion 84 in pumping chamber portion 86.

The axial length of the rotor array 82 is L' and the axial length of the rotor array 84 is L". L' is longer than L" so that the first stage of pumping has a greater volumetric pumping capacity/pumping speed ($m^3hu^{-1}$) than the second stage of pumping.

It is also possible that impeller (rotor) comprises a back plate 90 which is moveable relative to, whilst sealing against, the rotor blades 46 and rotor shaft 44 to change L' and L" and thus the volume in the first and second pumping stages.

The volume of each stage is sized to suit the incoming gas stream flow rates. For example if additional gas is required in the abatement device then the volume of the pump can be configured such that the volume of the second pumping stage is larger than that of the first pumping stage. Similarly, if the abatement device reduces the total gas flow the pump can be configured such that the volume of the second pumping stage is smaller than that of the first pumping stage.

Waste streams containing one or more target gases to be destroyed may often contain additional materials, solids, condensable vapours or permanent gases which are hydrolysable particulate forming materials (e.g $SiF_4$, $BCl_3$, $AlCl_3$) which are best removed prior to entry into a gas abatement system, e.g. a plasma reactor or a burner (such as, but not limited to, a fired radiant combustors).

In addition, the reaction of target species, especially perfluorinated compounds such as $CF_4$, $C_2F_6$, $NF_3$ is improved if there is a controlled proportion of water vapour in the gas stream containing the species, especially of the abatement is to be performed in a plasma reactor.

Furthermore, the by-products of the plasma reactor will include HF which requires to be dissolved in water in a wet scrubber.

Very often the abatement apparatus, for example a plasma abatement device, treats the gas stream most efficiently when the gas stream has a ratio of water vapour to gas is within a specific range of ratios R, thus it is advantageous if the liquid ring pump is configured to exhaust from the first stage of the liquid ring pump a gas stream which has a ratio of water vapour to gas within said range of ratios R. This can be achieved by varying the water temperature for a given first stage pumping capacity.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An abatement system for treating an effluent gas stream, the system comprising: a two-stage liquid ring pump having two pumping stages comprising respective gas inlets and gas outlets; and at least one abatement apparatus, wherein the gas inlet of the first pumping stage of the liquid ring pump is arranged to receive said effluent gas stream for treatment in the first pumping stage and the gas outlet of the first pumping stage is arranged to exhaust gas to the abatement apparatus, and the gas inlet of the second pumping stage of the liquid ring pump is arranged to receive gas treated by the abatement apparatus for treatment by the second pumping stage and the gas outlet of the second pumping stage is arranged to exhaust gas so that the effluent gas stream can be treated in series by the first pumping stage of the liquid ring pump, the abatement apparatus and the second pumping stage of the liquid ring pump.

2. The abatement system as claimed in claim 1, wherein the liquid ring pump comprises a pumping chamber in which a rotor is received for forming a liquid ring in the pumping chamber and pumping gas from the gas inlet to the gas outlet of the first pumping stage and from the gas inlet to the gas outlet of the second pumping stage.

3. The abatement system as claimed in claim 2, wherein the pumping chamber is non-circular in cross-section such that gas can be pumped from the gas inlets to the gas outlets of the first and second pumping stages for each half rotation of the rotor.

4. The abatement system as claimed in claim 3, wherein the pumping chamber is generally elliptical in cross-section and in the first pumping stage gas is pumped in a first direction relative to the minor axis of the ellipse and in the second pumping stage gas is pumped in a second, generally opposing direction relative to the minor axis.

5. The abatement system as claimed in claim 1, wherein the liquid ring pump comprises a pumping chamber in which a rotor is received having two arrays of impeller blades on axial sides thereof projecting into respective chamber portions of the pumping chamber for forming a liquid ring and pumping gas in the first pumping stage from the gas inlet to the gas outlet of the first chamber portion and in the second pumping stage from the gas inlet to the gas outlet of the second chamber portion.

6. The abatement system as claimed in claim 1, wherein the liquid ring pump comprises first and second pumping chambers in which respective rotors are received for forming liquid rings in the pumping chambers and pumping gas in the first pumping stage from the gas inlet to the gas outlet of the first pumping chamber and in the second pumping stage from the gas inlet to the gas outlet of the second pumping chamber, the rotors being supported rotation by a single drive shaft.

7. The abatement system as claimed in claim 1, wherein the liquid ring pumping stages are configured so that the volume of the first pumping stage is different to the volume of the second pumping stage so that a gas pumping speed of each stage is different.

8. The abatement system as claimed in claim 7, wherein the liquid ring pumping stages are configured so that the volume of the first pumping stage is smaller than the swept volume of the second pumping stage so that the gas pumping speed of the second pumping stage is greater than the pumping speed of the first pumping stage.

9. The abatement system as claimed in claim 7, wherein the liquid ring pumping stages are configured so that the volume of the first pumping stage is greater than the swept volume of the second pumping stage so that the gas pumping speed of the second pumping stage is smaller than the pumping speed of the first pumping stage.

10. The abatement system as claimed in claim 5, wherein the rotor comprises a back plate which is axially moveable relative to the rotor blades and rotor shaft axis to change the volume in the first and second pumping stages.

11. The abatement system as claimed in claim 3, wherein the pumping chamber is asymmetric such that that dissimilar pumping characteristics can be provided in the first pumping stage and the second pumping stage.

12. The abatement system as claimed in claim 11, wherein a volume of a pumping chamber portion of the first pumping stage is different to the volume of a pumping chamber portion of a second pumping stage such that different gas volumes can be accommodated in each stage when pumping gas through the first pumping stage compared to the second pumping stage.

13. The abatement system as claimed in claim 5, wherein the rotor arrays are asymmetric such that dissimilar pumping characteristics are provided in the first pumping stage and the second pumping stage.

14. The abatement system as claimed in claim 1, wherein the at least one abatement apparatus comprises a reaction chamber, plasma, catalyst or a burner device for treating gas passing therethrough after pre-scrubbing by the first pumping stage of the liquid ring pump and before post-scrubbing by the second pumping stage of the liquid ring pump.

15. The abatement system as claimed in claim 2, wherein the rotor is driven by a single drive mechanism comprising a motor and a drive shaft.

16. The abatement system as claimed in claim 1, wherein the at least one abatement apparatus treats the gas stream most efficiently when the gas stream entering said abatement apparatus has a ratio of water vapour to gas within a range of ratios R and the liquid ring pump is configured to exhaust from the first pumping stage of the liquid ring pump, a gas stream which has a ratio of water vapour to gas within said range of ratios R.

* * * * *